United States Patent
Watanabe et al.

(10) Patent No.: US 6,950,661 B2
(45) Date of Patent: Sep. 27, 2005

(54) LOCATION DETECTION METHOD, LOCATION DETECTION APPARATUS AND LOCATION DETECTION PROGRAM

(75) Inventors: Koji Watanabe, Kokubunji (JP); Mikio Kuwahara, Hachioji (JP); Katsuhiko Tsunehara, Hachioji (JP); Kenzaburo Fujishima, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 485 days.

(21) Appl. No.: 10/038,677

(22) Filed: Jan. 8, 2002

(65) Prior Publication Data

US 2002/0132624 A1 Sep. 19, 2002

(30) Foreign Application Priority Data

Feb. 6, 2001 (JP) ......................................... 2001-029560

(51) Int. Cl.$^7$ ................................................. H04Q 7/20
(52) U.S. Cl. ..................... 455/456.1; 342/126; 342/450
(58) Field of Search ........................... 455/404.2, 414.2, 455/440, 456.1, 457; 342/126, 450, 357.08, 357.06, 357.09, 457, 457.06; 340/989, 825.36, 539.13, 993, 426.19, 825.49

(56) References Cited

U.S. PATENT DOCUMENTS

| | | | | |
|---|---|---|---|---|
| 5,614,914 A | * | 3/1997 | Bolgiano et al. | 342/364 |
| 5,899,957 A | * | 5/1999 | Loomis | 701/214 |
| 6,061,018 A | | 5/2000 | Sheynblat | |
| 6,075,987 A | * | 6/2000 | Camp et al. | 455/427 |
| 6,108,558 A | * | 8/2000 | Vanderspool, II | 455/456.2 |
| 6,212,392 B1 | * | 4/2001 | Fitch et al. | 455/456.2 |
| 6,369,756 B1 | * | 4/2002 | Wang et al. | 342/367 |
| 6,405,213 B1 | * | 6/2002 | Layson et al. | 707/104.1 |
| 6,683,568 B1 | * | 1/2004 | James et al. | 342/387 |

FOREIGN PATENT DOCUMENTS

| | | |
|---|---|---|
| CA | 02220365 | 11/1997 |
| EP | 0 930 513 A2 | 12/1998 |
| JP | 62-272172 | 5/1986 |
| JP | 63-006478 | 6/1986 |
| JP | 63-177016 | 12/1986 |
| JP | 05-040162 | 8/1991 |
| JP | 7-181242 | 12/1993 |
| JP | 11-083978 | 9/1997 |
| JP | 2001-021636 | 7/1999 |
| WO | WO 00/16436 | 9/1999 |
| WO | WO 00/69198 | 5/2000 |
| WO | WO 01/05184 A1 | 6/2000 |

OTHER PUBLICATIONS

U.S. Appl. No. 09/940,548, filed Aug. 29, 2001, Tsunehara et al.

* cited by examiner

*Primary Examiner*—Charles Appiah
*Assistant Examiner*—Nghi H. Ly
(74) *Attorney, Agent, or Firm*—Reed Smith LLP; Stanley P. Fisher, Esq.; Juan Carlos A. Marquez, Esq.

(57) ABSTRACT

A location calculation method for calculating, by using propagation delay time of signals received from wireless transmitters, a location of a reception point of the signals to thereby reduce errors in the distance measurement due to an erroneous detection of a path of a received signal includes first step of measuring reception timing of signals received from the wireless transmitters, second step of estimating, according to results of measurement of the reception timing obtained by the first step, an erroneous result of measurement, and third step of removing the results of measurement estimated as the erroneous results by the second step from the results of measurement of the reception timing obtained by the first step, and thereby calculating the location of the reception point.

16 Claims, 13 Drawing Sheets

LOCATION DETECTION METHOD, LOCATION DETECTION APPARATUS AND LOCATION DETECTION PROGRAM

CROSS-REFERENCE TO RELATED APPLICATION

The present invention is related to copending application Ser. No. 09/940,548 filed Aug. 29, 2001 and assigned to the assignee of the present application.

BACKGROUND OF THE INVENTION

The present invention relates to a method of measuring a location of a receiver according to propagation delay time of a signal transmitted from a wireless transmitter, and in particular, to a method of measuring a location of a receiver according to propagation delay time of a signal sent from a base station of a cellular communication system.

In a mobile communication system, there has been proposed a technique to detect a location of a terminal device or a terminal according to a signal sent from a base station. For example, JP-A-7-181242 (laid-open on Jul. 21, 1995) proposes a technique in which in a Code Division Multiple Access (CDMA) system, a location of a terminal is measured by obtaining time differences between transmission times of a pseudo-noise (PN) code from respective base stations by use of locations of the base stations and propagation times of signals sent from the base stations to the terminal.

SUMMARY OF THE INVENTION

In a location measuring system of the prior art, a path of a received signal is detected by analyzing a delay profile. Therefore, there possibly occurs an error in the measured location due to influence of a delayed wave associated with multiple paths, influence of noise in a received signal, influence of interference caused by a cross correlation between PN codes, and the like.

It is therefore an object of the present invention to reduce the error in measured range or distance caused by incorrect detection of the path of the received signal.

According to an aspect of the present invention, there is provided a location calculation method for calculating, by using propagation delay time of signals received from a plurality of wireless transmitters, a location of a reception point of receiving the signals, comprising a first step of measuring reception timing of signals received from said wireless transmitters, a second step of estimating, according to results of measurement of the reception timing obtained by said first step, an erroneous result of measurement, and a third step of removing the results of measurement estimated as the erroneous results by the second step from the results of measurement of the reception timing obtained by said first step, and thereby calculating the location of said reception point.

According to another aspect of the present invention, there is provided a location calculation apparatus (wireless terminal) for calculating, by using propagation delay time of signals received from a plurality of wireless transmitters, a location of a reception point of receiving the signals, comprising reception timing measuring means for measuring reception timing of signals received from said wireless transmitters, erroneous measurement estimating means for estimating, according to results of measurement of the reception timing measured by said reception timing measuring means, erroneous results of measurement, and location calculating means for removing the results of measurement estimated as the erroneous results by said erroneous measurement estimating means from the results of measurement of the reception timing obtained by said reception timing measuring means, and thereby calculating the location of said location calculating means.

According to another aspect of the present invention, the location of the wireless terminal is calculated by removing a result of incorrect path detection due to influence of the delayed wave associated with multiple paths, the noise in a received signal, the mutual interference of the neighboring base stations, and the like. Therefore, accuracy or precision of the range measurement is improved and hence precision of the measurement of the terminal location is improved.

BRIEF DESCRIPTION OF THE DRAWINGS

The objects and features of the present invention will become more apparent from the consideration of the following detailed description taken in conjunction with the accompanying drawings in which.

DETAILED DESCRIPTION OF THE EMBODIMENTS

Figure 1:
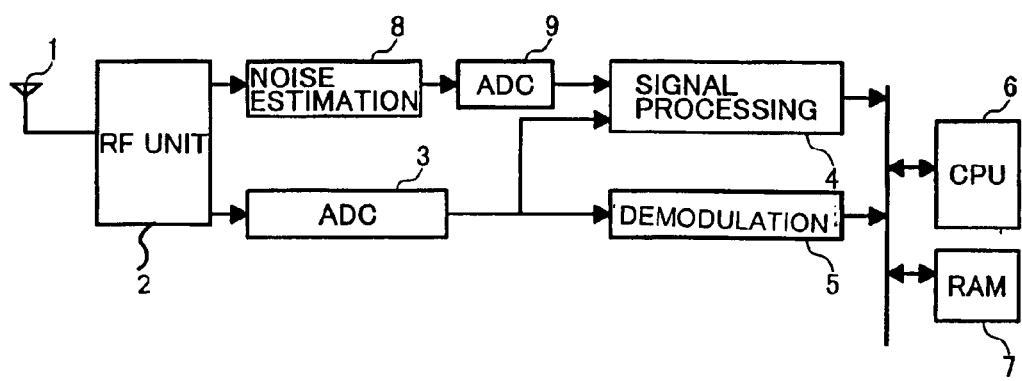
FIG. 1 is a block diagram of an embodiment of a wireless terminal according to the present invention.

Referring now to the drawings, description will be given of an embodiment of the present invention.

FIG. 1 shows in a block diagram a primary configuration of a wireless terminal in an embodiment of the present invention.

In this system, a signal received by an antenna 1 is converted by a radio frequency (RF) unit (wireless section) 2 into a baseband signal. The resultant baseband signal is converted by an analog-to-digital (A/D) converter 3 into a digital signal. A signal processing section 4 calculates a correlation between the received signal and a reference signal to generate a delay profile and stores the delay profile in a random access memory (RAM) 7. The signal processing section 4 also measures timing of reception of a signal transmitted from a base station and stores the timing in the RAM 7. Additionally, the signal processing section 4 calculates an S/N ratio of a signal associated with a value of the delay profile at timing of the reception of the signal from each base station to determine whether or not the signal is acceptable and then stores a result of the determination in the storage, i.e., the RAM 7.

A demodulator section 5 receives a signal to acquire therefrom information included in a signal transmitted from the base station. For example, in a CDMA (ARIB STD-T53) cellular system, timing at which each base station transmitted a reference signal can be detected using an offset value of transmission timing of a PN code stored in a sync channel. According to information of the transmission timing, the wireless terminal can calculate transmission timing of the base station. The base station to receive the sync channel is identified as a sync base station.

A central processing unit (CPU) 6 calculates difference between the reception timing obtained through the delay profile analysis and the transmission timing of the base station to obtain propagation delay time and thereby calculates propagation distance. According to a result of measurement of the propagation distance, the CPU 6 estimates a propagation distance incorrectly detected. The estimation method will be described later. Using a propagation distance obtained by subtracting the propagation distance determined as incorrectly detected distance from the calculation result of propagation distance, the CPU 6 estimates a location of a wireless terminal. Moreover, the CPU 6 may also estimate a location of a wireless terminal using propagation delay time obtained by subtracting a propagation delay time determined as incorrectly detected delay time from the calculation result of propagation delay time.

Although the CPU 6 calculates the propagation distance to estimate the incorrectly detected propagation distance and thereby estimates the location of the wireless terminal in this configuration, the calculation may be arranged in the RF unit 2. In such a configuration, for example, a program to execute a location calculation method, which will be described later, is stored to be kept in a storage (memory) such that a B/B-LSI unit to execute baseband processing reads the program from the storage and then executes the program. In another configuration, an LSI unit other than the baseband LSI unit includes a CPU and a storage (memory) and the program is stored to be kept in the storage such that the LSI reads the program from the storage and then executes the program to conduct the calculation.

A noise measurement section 8 extracts noise from the baseband signal converted by the RF unit (wireless section) 2. The noise extracted by the noise measurement section 8 is converted by an A/D converter section 9 into a digital signal. An S/N ratio of the signal is then calculated by the signal processing section 4 to be stored in the RAM 7.

The wireless terminal observes, at one position, signals transmitted from a plurality of base stations. The wireless terminal measures propagation distances using propagation delay time of signals received at least three base stations. Using the locations of three base stations as known items, the wireless terminal measures a location thereof using a method of intersection.

Figure 2:
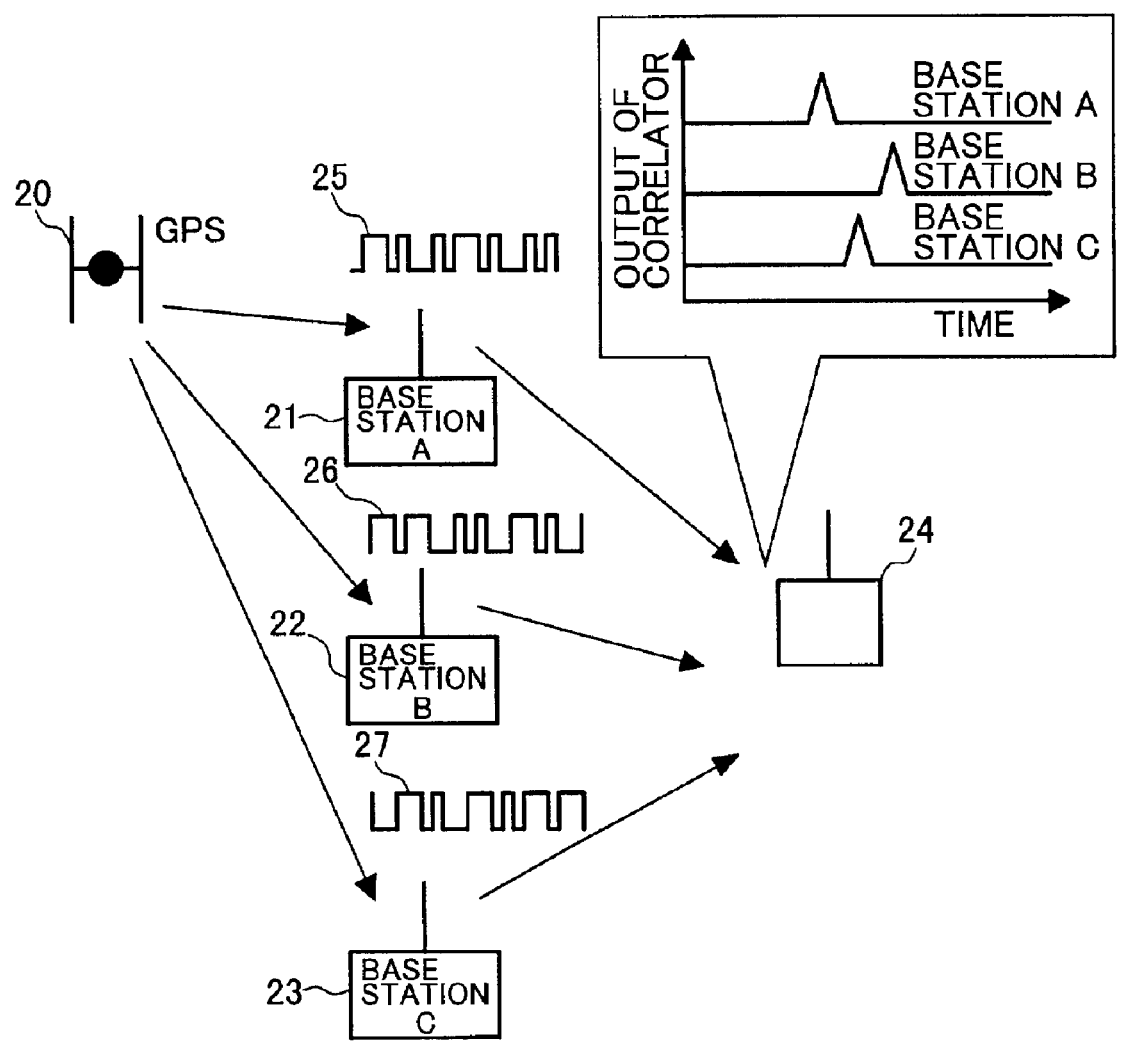
FIG. 2 is a diagram showing a configuration of an embodiment of a location measurement system according to the present invention.

FIG. 2 shows a configuration of a location measurement system to which an embodiment of a wireless terminal of the present invention is applied.

Figure 3:
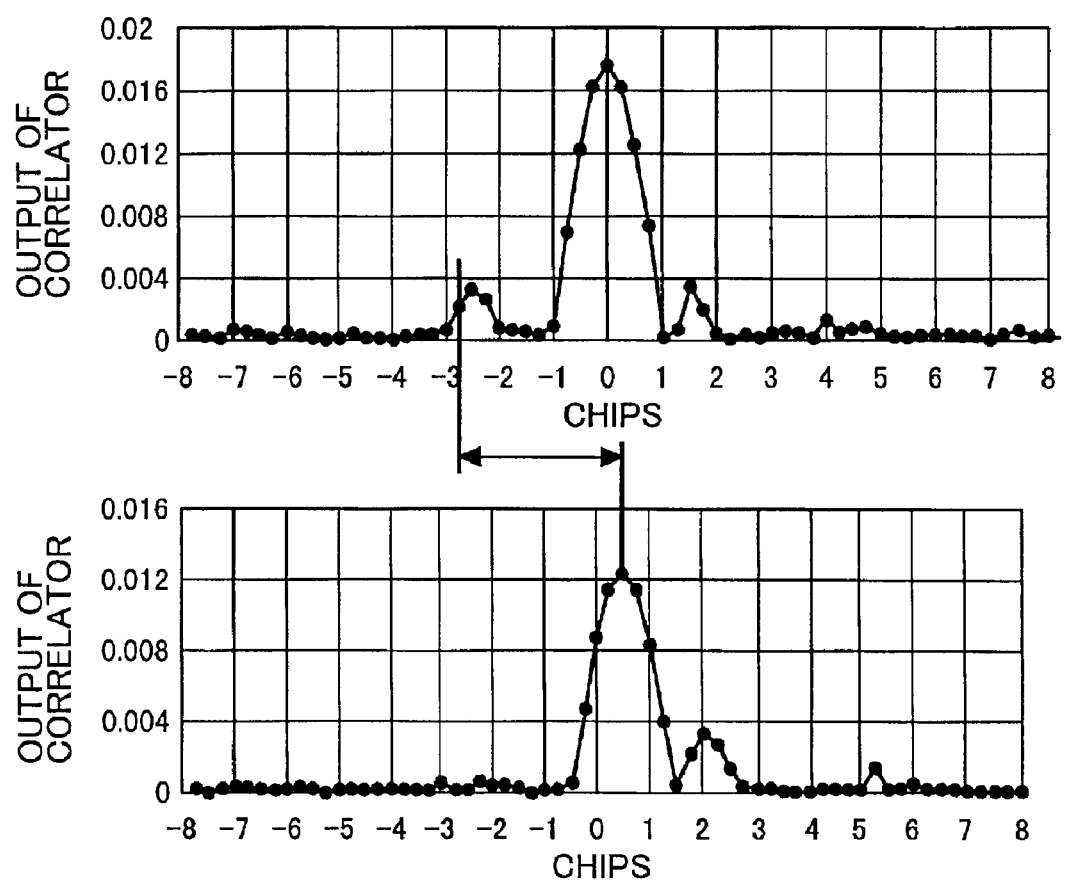
FIG. 3 is a graph showing a delay profile in an embodiment of the present invention.

Base stations 21 to 23 operate at timing synchronized with time signals from a GPS satellite 20 and transmit reference signals to a wireless terminal 24 at timing synchronized with the GPS satellite 20. Having received the signals from the base stations 21 to 23, the wireless terminal 24 conducts a correlation operation by a sliding correlator of the signal processing section 4 to obtain a delay profile (FIG. 3). In the CDMA system, the wireless terminal 24 conducts a correlation operation between received signals and a particular code pattern (a common pilot signal transmitted from each base station) to detect timing to receive the reference signal transmitted from the base station 21 or the like.

As already described, the base station 21 or the like establishes synchronization with a time signal from the GPS satellite 20 to adjust the reference time and transmits a pilot signal at particular transmission timing (offset time). Information of the offset time is transmitted via a sync channel. The wireless terminal 24 can obtain the offset time information. The wireless terminal 24 calculates difference between the measured reception timing and the transmission timing extracted from the signal on the sync channel to determine a propagation delay time of the radio wave. The propagation delay time corresponds to a propagation time of a radio wave from the base station 21 to the wireless terminal 24. The base station 21 or the like includes a plurality of sectors and a transceiver and an antenna for each sector. The base station 21 transmits mutually different signals from the respective sectors (pilot signals having mutually different offset time values). Therefore, for each of the signals from one base station, the wireless terminal 24 can identify a sector of the base station from which the signal is transmitted.

FIG. 3 shows examples of a delay profile resultant from the correlation operation in the embodiment of the wireless terminal according to the present invention.

A delay profile indicates a delay path to be observed. In the graph of FIG. 3, the abscissa corresponds to a chip of a spread code and indicates reception timing (propagation delay time) corrected using the transmission timing of the base station 21 or the like. The ordinate corresponds to an output of the correlation operation, and a section of the graph having a large correlation value indicates that a signal is received with the associated delay time, that is, presence of a path (a path with the propagation time).

Using the delay profile, it is possible to obtain delay time necessary for a radio wave to propagate, for example, from the base station 21 to the terminal 24. Since the terminal 24 cannot absolutely detect correct time, there is obtained a relative delay time.

The propagation distance difference can be obtained by multiplying the light velocity by the relative delay time difference obtained through the delay profile analysis. When the propagation distance difference is thus obtained for each of at least three base stations, the location can be estimated in the method of intersection using the locations of the base stations as known items. By changing the combination of three base stations selected from the three or more base stations, a plurality of estimated locations of the terminal 24 are calculated. Using the results of the estimation, a likelihood value of the terminal location is obtained.

Figure 4:
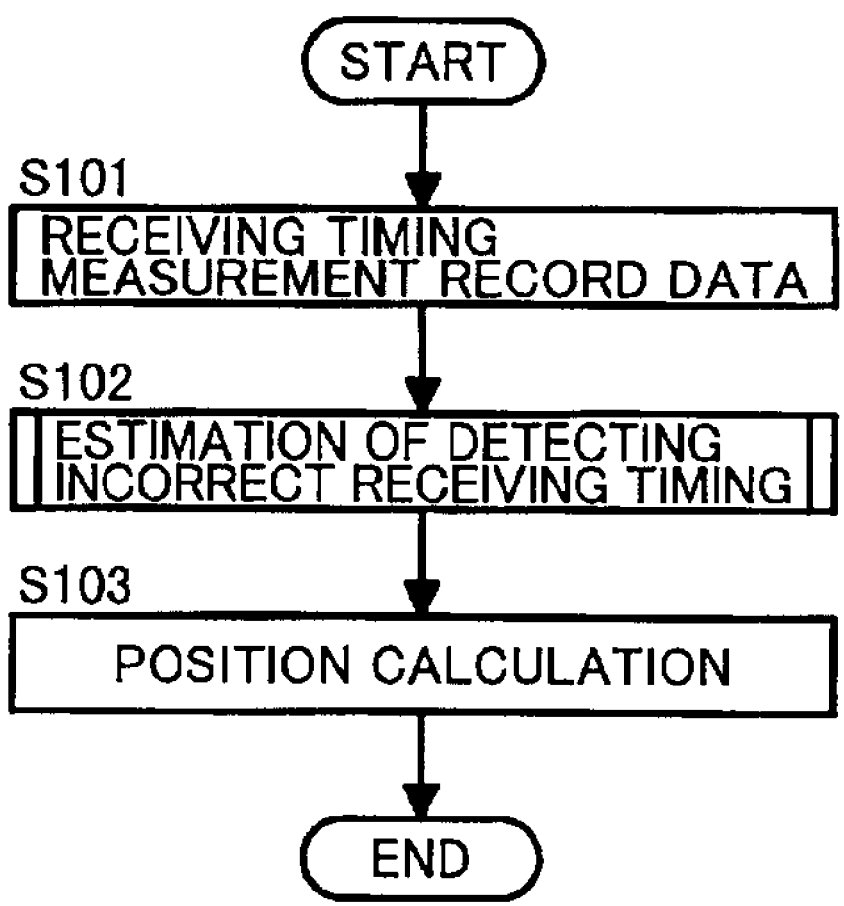
FIG. 4 is a flowchart of a location calculation method in an embodiment of the present invention.

FIG. 4 is a flowchart showing a method of calculating a location of a wireless terminal in an embodiment of the present invention.

First, the signal processing section 4 measures timing (propagation delay time) of reception of a signal transmitted from each base station and stores the timing in the RAM 7 (S101). Using the measured results stored in the RAM 7, the CPU 6 estimates a measured result incorrectly detected (S102). Details of a method of estimating the measured result incorrectly detected will be described later. Using the propagation delay time excepting the measured result incorrectly detected, the CPU 6 calculates a location of the wireless terminal (S103).

Figure 5:
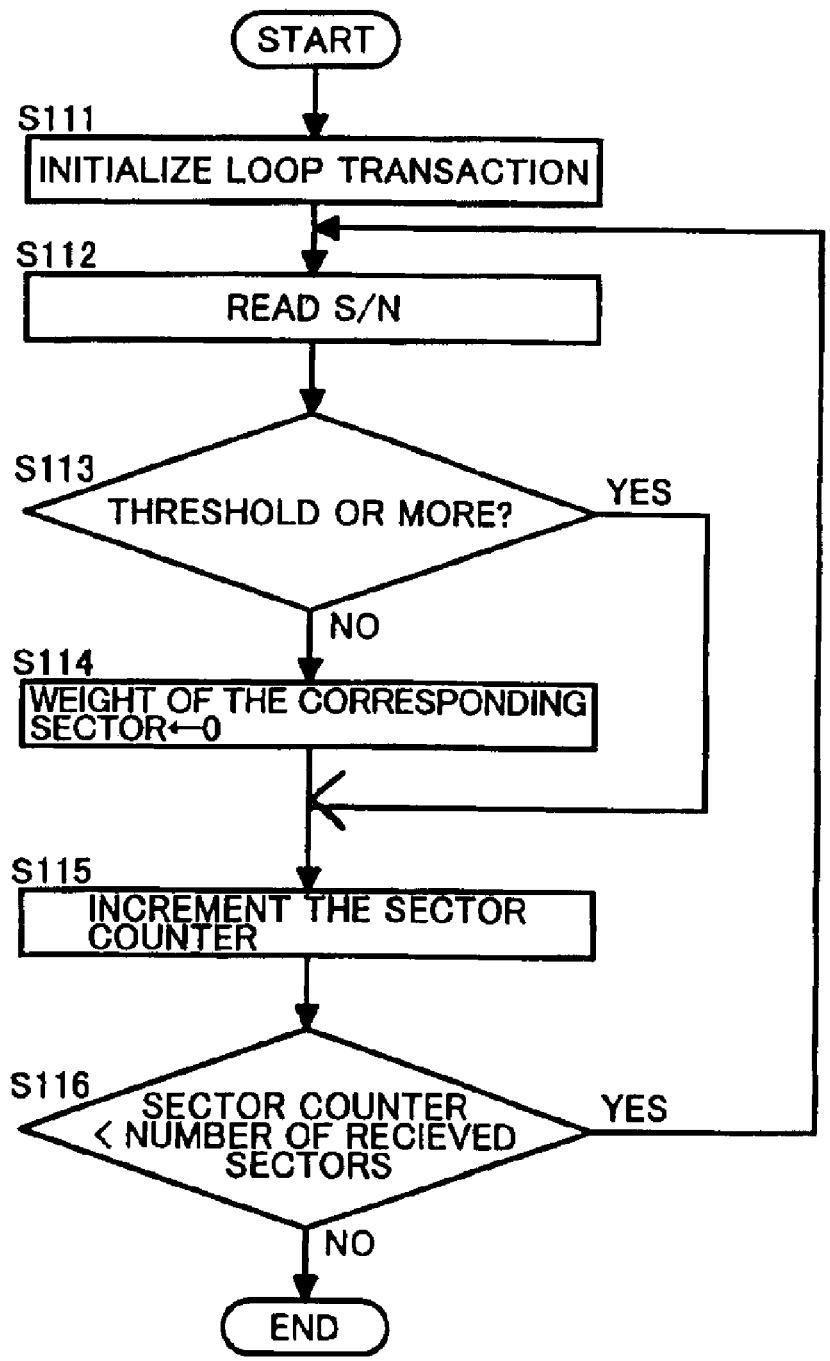
FIG. 5 is a flowchart of a first embodiment of an estimation method of incorrect detection.

FIG. 5 is a flowchart showing an estimation method of incorrect detection in the location calculation method in an embodiment of the present invention.

In the estimation method of incorrect detection, a measurement result of a sector of which the S/N ratio at reception timing is less than a threshold value is estimated as a measurement result of an incorrect detection. This method is a subroutine to be called in step S102 of the location calculation method (FIG. 4) in the embodiment of the present invention.

First, a loop transaction is initialized (S111). Thereafter, an SIN ratio of each sector of the signal analyzed by the signal processing section 4 is read from the RAM 7 (S112). For each sector, the S/N ratio is compared with a predetermined threshold value (S113). If the S/N ratio is less than the threshold value, the signal of the SIN ratio is regarded as unacceptable. The weight for the sector is set to "0" to remove the delay time of the sector from the location measurement calculation. If the S/N ratio is equal to or more than the threshold value, the signal of the S/N ratio is regarded as acceptable. The weight for the sector is set to other than "0", and control proceeds to step S115.

To conduct the calculation for a subsequent sector, "1" is added to the sector counter to update the sector counter (S115). The processing ranging from S112 to S115 is repeatedly executed until the counter reaches the maximum value (the number of all sectors received; S116).

After the estimation of incorrect detection is completely finished, control goes to step S103 of the location calculation method (FIG. 4) to calculate a location of the wireless terminal by removing the information of the sector of which the weight is "0".

Figure 6:
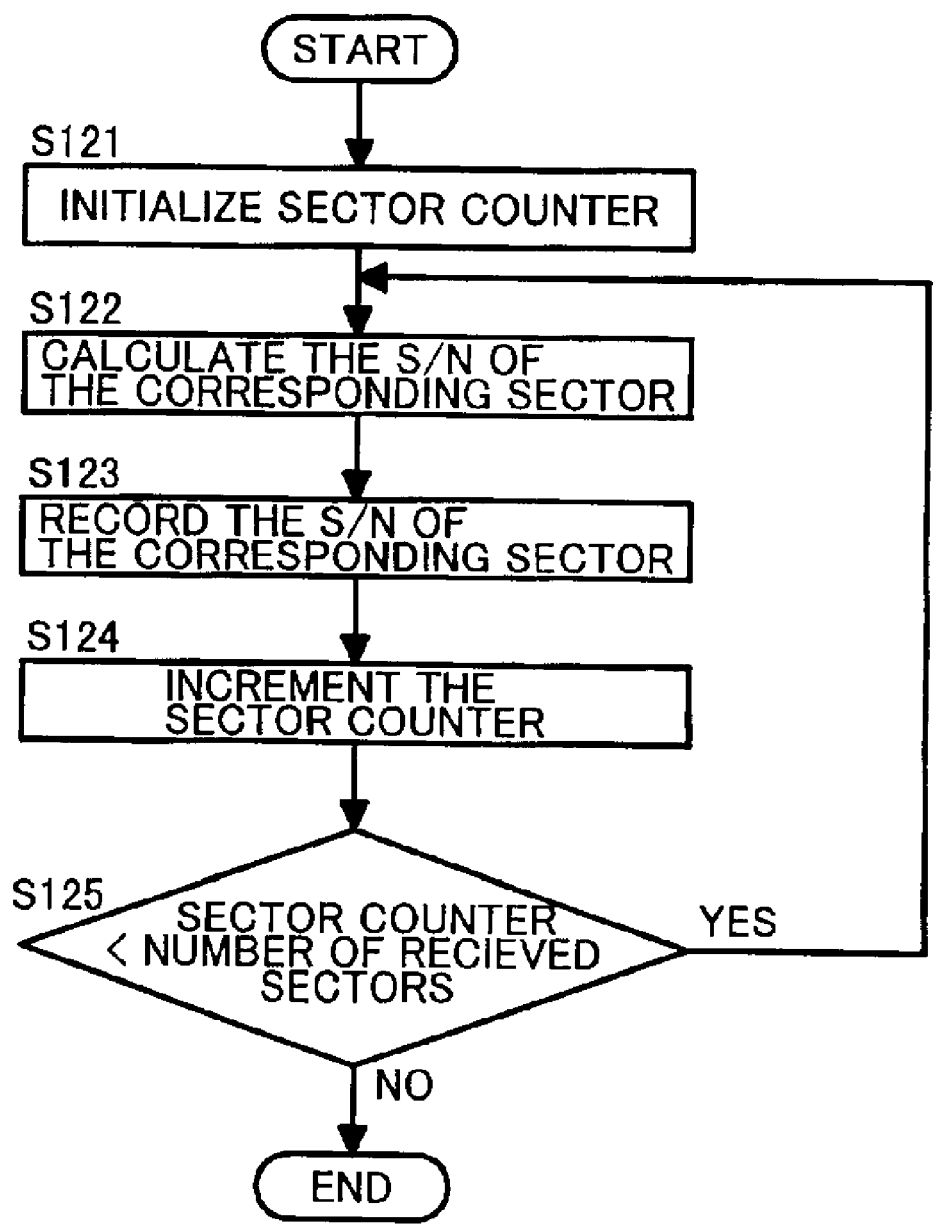
FIG. 6 is a flowchart of a first embodiment of a signal-to-noise (S/N) ratio calculation method.

In the estimation method of incorrect detection shown in FIG. 5, the signal processing section 4 calculates an S/N ratio according to the noise extracted by the noise measurement section 8. FIG. 6 shows the S/N ratio calculation and a method of recording the S/N ratio in the RAM 7.

First, "0" is set to the sector counter to select a sector to initialize the sector counter (S121). Using noise extracted from the signal of the first sector, the noise measurement section 8 calculates an S/N ratio for the first sector (S122) and then stores the calculated S/N ratio in the RAM 7 (S123). To calculate an S/N ratio for a subsequent sector, the sector counter is updated (S124). A check is made to determine whether or not the count value of the sector counter is less than the number of the sectors from which the signals are received. If the count value is equal to or more than the number of the sectors ("No" in step S125), it is assumed that the S/N ratio has been calculated for all sectors and hence the processing is terminated. If the count value is less than the number of the sectors ("Yes" in step S125), it is assumed that the S/N ratio has not yet been calculated for all sectors, and hence control returns to step S122 to calculate an S/N ratio for a subsequent sector.

The location calculation method to which the first embodiment of the estimation method of incorrect detection is applied is a location calculation method in which the propagation delay tune of a signal transmitted from each of a plurality of base stations is used to calculate a location of a wireless terminal to receive the signals. This method includes a first step of measuring reception timing of signals received from said wireless transmitters; a second step of assuming, according to results of measurement of the reception timing obtained by said first step, that is, according to a result of a comparison between the S/N ratio of a signal for which the reception timing is measured by the first procedure and a predetermined value (when the S/N ratio associated with the reception timing is less than the predetermined threshold value (or equal to or less than the predetermined threshold value)), that the signal for which the reception timing is measured is unacceptable and of estimating the result of measurement as an erroneous result of measurement (incorrect detection); and a third step of removing the results of measurement estimated as the erroneous results by the second step from the results of measurement obtained by said first step, and thereby calculating the location of the wireless terminal. Therefore, it is possible to remove incorrect pass detection results caused by influence of noise of the receiver and influence of mutual interference of the neighboring base station.

Moreover, the wireless terminal of the first embodiment is a wireless terminal for calculating, by using propagation delay time of signals received from a plurality of base stations, its own location which is a location of a reception point of receiving the signals. The wireless terminal comprises reception timing measuring means for measuring reception timing of signals received from said base stations, erroneous measurement estimating means for estimating, according to results of measurement of the reception timing measured by said reception timing measuring means, erroneous results of measurement; and location calculating means for removing the results of measurement estimated as the erroneous results by said erroneous measurement estimating means from the results of measurement of the reception timing obtained by said reception timing measuring means, and thereby calculating the, location of said wireless terminal. The erroneous measurement (incorrect detection) estimating means assumes, according to a result of a comparison between the S/N ratio of a signal for which the reception timing is measured by the first procedure and a predetermined value (when the S/N ratio associated with the reception timing is less than the predetermined threshold value (or equal to or less than the predetermined threshold value), that the signal for which the reception timing is measured is unacceptable and estimates the result of measurement as an erroneous result of measurement (incorrect detection)). Therefore, the accuracy of location measurement can be improved in the wireless terminal.

Figure 7:
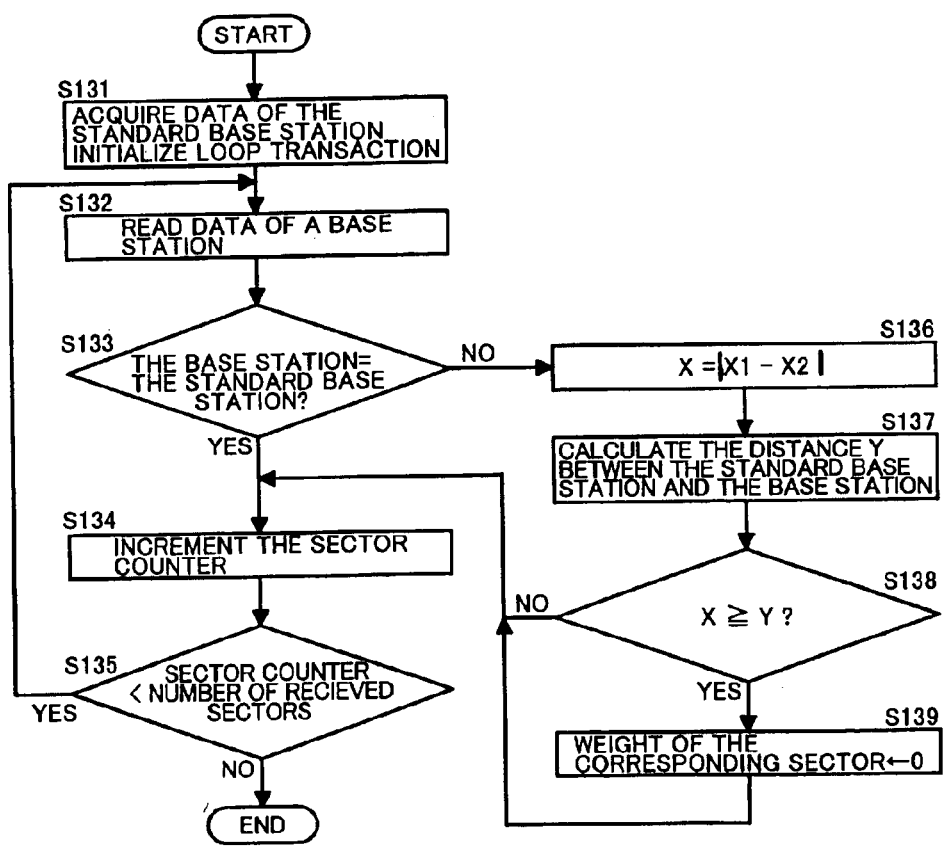
FIG. 7 is a flowchart of a second embodiment of an estimation method of incorrect detection.

FIG. 7 is a flowchart showing a second embodiment of the estimation method of incorrect detection according to the present invention.

According to the second embodiment of the estimation method of incorrect detection, when three points including the location or position of the wireless terminal, the position of the standard base station, and the position of the trial base station (a base station to which a sector currently being checked belongs) do not satisfy the condition to form a triangle, the result of measurement of the trial base station is estimated as a result of incorrect detection. Like the first embodiment of the estimation method of incorrect detection (FIG. 5), the second embodiment thereof is also a subroutine to be called in step S102 in the location calculation method (FIG. 4) in the embodiment of the present invention.

First, information of the standard base station is acquired to initialize a loop transaction (S131). Thereafter, base station information is read from the RAM (S132). A check is made to determine whether or not the base station is the standard base station (S133).

If the base station is the standard base station ("Yes" in step S133), "1" is added to the count value of the sector counter to update the sector counter for the processing of a subsequent sector in which the triangle condition is checked to estimate incorrect detection (S134). A check is then made to determine whether or not the count value of the sector counter is less than the number of the sectors from which the signals are received. If the count value is equal to or more than the number of the sectors ("No" in step S135), it is assumed that the incorrect detection has been checked for all sectors and hence the processing is terminated. If the count value is less than the number of the sectors ("Yes" in step S135), it is assumed that the incorrect detection has not yet been estimated for all sectors according to the triangle condition, and hence control returns to step S132 to estimate incorrect detection for a subsequent sector.

On the other hand, if the base station is other than the standard base station ("No" in step S133), a check is made to determine whether or not the locations of three points of the wireless terminal, the standard base station, and the trial base station satisfy the condition to form a triangle (S136 to S138). This is determined using a condition that the total length of any two sides of a triangle exceeds the length of one remaining side thereof. In other words, A+B>C holds when three sides of the triangle has lengths of A, B, and C.

Specifically, a difference in distance or range is calculated between a distance X1 between the wireless terminal and the trial base station and a distance X2 between the wireless terminal and the standard base station (X136). The difference is expressed as X=|X1−X2|. Next, a distance Y is calculated between the standard base station and the trial base station (S137). X is then compared with Y (S138). If X is equal to or more than Y ("Yes" in step S138), the locations of three points of the wireless terminal, the standard base station, and the trial base station cannot form a triangle. Consequently, it is estimated that the propagation delay time measured for the sector includes an error, and hence "0" is set to the weight of the sector. On the other hand, if X is less than Y ("No" in step S138), the locations of three points of the wireless terminal, the standard base station, and the trial base station can form a triangle. Consequently, it is estimated that the propagation delay time measured for the sector is valid. To estimate the incorrect detection for a subsequent sector, "1" is added to the count value of the sector counter to update the sector counter (S134). In this connection, X≧Y is used in place of X>Y in step S138 such that the incorrect detection is not assumed when X=Y for the following reason. When X=Y, it is assumed that the wireless terminal, the standard base station, and the trial base station exist on one straight line.

When the estimation of incorrect detection is completely finished, control goes to step S103 of a main routine (FIG. 4) to calculate the location of the wireless terminal using the information excepting the information of the sector with a weight of "0".

Another method may be used to determine the condition to form a triangle. Concretely, a calculation is first conducted to obtain the total length Z of the distance X1 between the wireless terminal and the trial base station and the distance X2 between the wireless terminal and the standard base station. Next, the distance Y is calculated between the standard base station and the trial base station. Z is compared with Y. If Z is less than Y, "0" is set to the weight for the sector.

As above, the location calculation method to which the second embodiment of the estimation method of incorrect detection is applied is a location calculation method in which according to propagation delay time of a signal received from each of a plurality of base stations, a location of a wireless terminal to receive the signal is calculated. The method includes a first procedure or a step to measure reception timing of a signal transmitted from a base station, a procedure to determine a standard base station in a plurality of base stations from which signals are received by the wireless terminal; a second procedure in which according to results of measurement of the reception timing obtained by the first procedure, that is, according to a result of a check to determine whether or not a triangle is formed using the distance between the wireless terminal and the standard base station, the distance between the wireless terminal and the base station for the estimation, and the distance between the standard base station and the base station for the estimation (whether or not the locations of three points of the wireless terminal, the standard base station, and the base station for the estimation satisfy the condition to form a triangle), whereby it is assumed that the signal from the base station for the estimation is unacceptable and the result of measurement of the base station is an erroneous result of measurement (incorrect detection) if the triangle condition is not satisfied; and a third procedure to calculate the location of the wireless terminal by removing the result of measurement estimated as incorrect detection by the second procedure from the result of measurement obtained by the first procedure. Therefore, it is possible to remove incorrect pass detection results caused by influence of noise of the receiver and influence of mutual interference of the neighboring base station. Consequently, the accuracy of the range measurement is improved and the accuracy of the measurement of the terminal location is improved in the wireless terminal.

In the unit to estimate incorrect detection of the second embodiment of the wireless terminal, according to a result of a check to determine whether or not a triangle is formed using the distance between the wireless terminal and the standard base station, the distance between the wireless terminal and the base station for the estimation, and the distance between the standard base station and the base station for the estimation (whether or not the locations of three points of the wireless terminal, the standard base station, and the base station for the estimation satisfy the condition to form a triangle), it is estimated that the signal from the base station for the estimation is unacceptable and the result of measurement of the base station is an erroneous result of measurement (incorrect detection) if the triangle condition is not satisfied. Therefore, precision of the location measurement is improved in the wireless terminal.

Figure 8:
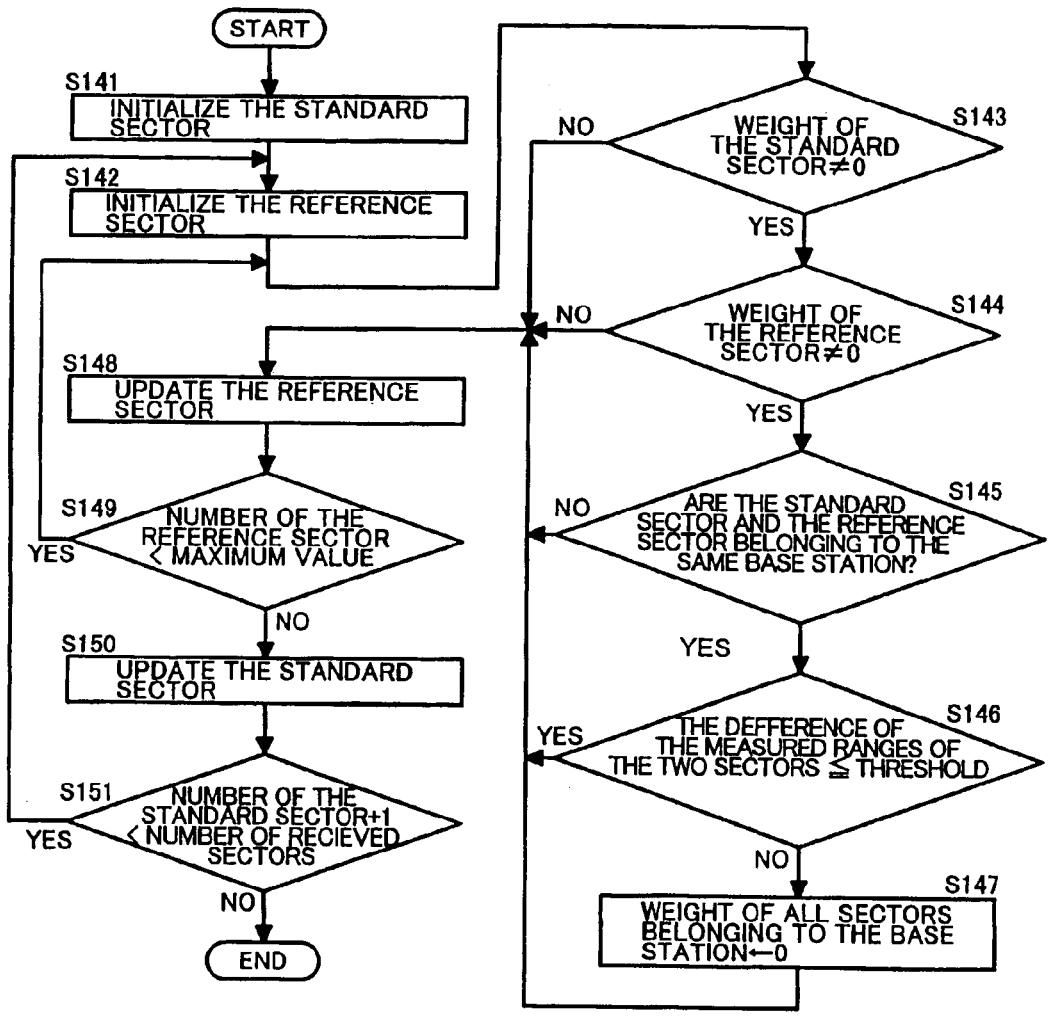
FIG. 8 is a flowchart of a third embodiment of an estimation method of incorrect detection.

FIG. 8 is a flowchart showing a third embodiment of the estimation method of incorrect detection according to the present invention.

According to the third embodiment of the estimation method of incorrect detection, since the sectors of one base station are disposed with a short distance therebetween, when the difference between the results of distance measurement between the sectors exceeds a predetermined threshold value, the result of distance measurement of the base station is estimated as a result of incorrect detection. Like the first or second embodiment of the estimation method of incorrect detection (FIGS. 5 and 7), the third embodiment thereof is also a subroutine to be called in step S102 in the location calculation method (FIG. 4) in the first embodiment of the present invention.

First, to execute processing of the estimation of incorrect detection, "0" is set to the standard sector counter to initialize the standard sector (S141) and "0" is set to the reference sector counter to initialize the reference sector (S142). A check is made to determine whether or not the weight of the standard sector is "0" (S143). If the weight is "0" ("No" in step S143), control proceeds to step S148 without setting the weight of the base station (S147). On the other hand, if the weight is not "0" ("Yes" in step S143), control proceeds to a subsequent step (S144).

In step S144, a check is made to determine whether or not the weight of the reference sector is "0". If the weight is "0" ("No" in step S144), control proceeds to step S148 without setting the weight of the base station (S147). On the other hand, if the weight is not "0" ("Yes" in step S144), a check is made to determine whether or not the standard sector and equal to the reference sector belong to one base station (S145). If the base station of the standard sector is other than that of the reference sector ("No" in step S145), control proceeds to step S148 without setting the weight of the base station (S147). On the other hand, if the base station of the standard sector is equal to that of the reference sector ("Yes" in step S145), the weight of the base station is set according to the difference in the measured distance (S146 to S148).

In short, according to the third embodiment of the estimation method of incorrect detection, the weight of the base station is set in the case in which neither the weight of the standard sector nor that of the reference sector is "0" (S143 and S144) and the standard and reference sectors belong to the same base station (S145).

After the check for the setting of the weight of the base station (S143 to S145) is completely finished, a difference is calculated between the result of distance measurement X1 between the reference sector and the wireless terminal and that of distance measurement X2 between the standard sector and the wireless terminal and then an absolute value thereof, i.e., X=|X1−X2| is compared with a predetermined threshold value. The correspondence between the base station and the sectors is beforehand stored in the RAM 7 for the processing of estimation of incorrect detection. When the difference of distance exceeds the threshold value ("No" in step S146), it can be estimated that an error exists in either one of the results of distance measurement. Therefore, "0" is set as the weight to all sectors of the same base station (S147).

Thereafter, to estimate incorrect detection using the difference between the measurement results for a subsequent reference sector, the reference sector counter is updated (S148). The value of the reference sector counter is then compared with the maximum value of the reference sector counter (the total number of the reference sectors received). If the value of the reference sector counter is less than the total number of the reference sectors received ("Yes" in step S149), it is assumed that the estimation of correct detection using the difference between the measurement results has not been completely finished, and hence control returns to step S143. For the next reference sector, a difference of distance is calculated between the sectors to estimate the incorrect detection (S143 to S147).

On the other hand, if the value of the reference sector counter is equal to or more than the total number of the reference sectors received, it is assumed that the estimation of correct detection using the difference between the measurement results has been completely finished for all reference sectors ("No" in step S149). To estimate the incorrect detection using the difference in distance with a subsequent sector set as a standard sector, the standard sector is updated (a value is added to a counter indicating the standard sector; S150). A value obtained by adding "1" to the value of the standard sector counter is compared with the number of received sectors (the maximum value of the standard sectors, namely, the total number of the received standard sectors). If "value of standard counter+1" is equal to or more than the total number of the received standard sectors ("No" in step S151), it is assumed that the estimation of incorrect detection using the S/N ratio has been completely finished for any sector possibly used as a standard sector, and hence the processing is terminated.

On the other hand if the "value of standard counter+1" is less than the total number of the received standard sectors ("Yes" in step S151), it is assumed that the estimation of incorrect detection using the S/N ratio has not been yet finished for the reference sectors, and hence control returns to step S142. The reference counter is then initialized (S142). Beginning at the first one of the reference sectors, the estimation of incorrect detection is determined according to the difference of measured distance between the sectors using a different standard sector (S143 to S147).

As above, the location calculation method to which the third embodiment of the estimation method of incorrect detection is applied is a location calculation method in which according to propagation delay time of a signal received from a base station having a plurality of sectors, a location of a wireless terminal to receive the signal is calculated. The method includes a first procedure to measure reception timing of a signal transmitted from a base station, a second procedure in which according to a results of comparison between the results of distance measurement for the respective sectors of the same base station and a predetermined threshold value (when the difference between the results of distance measurement for the respective sectors of the same base station is equal to or more than (or exceeds) the threshold value), it is assumed that the signal from the base station (or the sector) is unacceptable and the result of measurement of the base station (or the sector) is an erroneous result of measurement (incorrect detection), and a third procedure to calculate the location of the wireless terminal by removing the result of measurement estimated as incorrect detection by the second procedure from the result of measurement obtained by the first procedure. Therefore, it is possible to remove incorrect pass detection results caused by detection of a delayed wave due to the multipath, and hence the accuracy of the range measurement is improved and the precision of the measurement of the terminal location is improved in the wireless terminal.

In the unit to estimate incorrect detection of the third embodiment of the wireless terminal, according to a result of comparison between the results of distance measurement for the respective sectors of the same base station and a predetermined threshold value (when the difference between the results of distance measurement for the respective sectors of the same base station is equal to or more than (or exceeds) the threshold value), it is assumed that the signal from the base station (or the sector) is unacceptable and the result of measurement of the base station (or the sector) is an erroneous result of measurement (incorrect detection). Therefore, the location measurement precision is improved in the wireless terminal.

Figure 9:
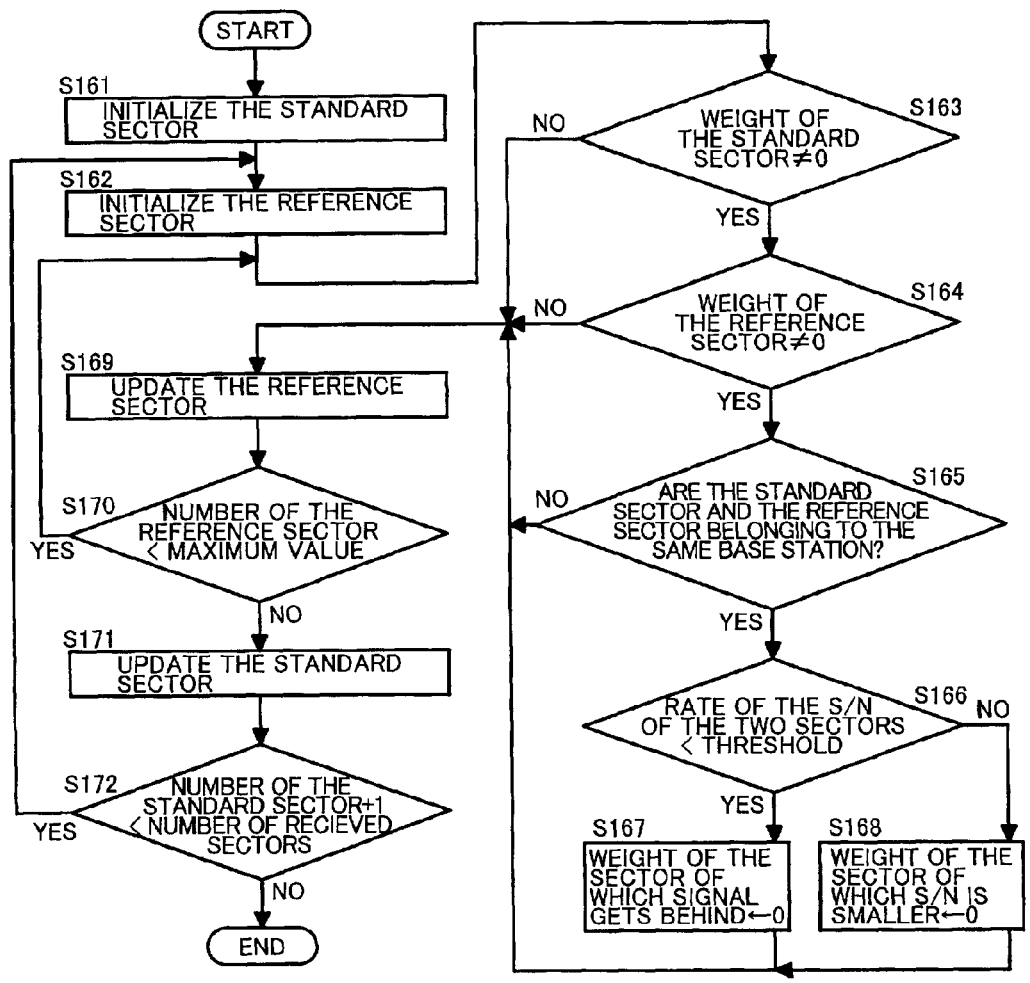
FIG. 9 is a flowchart of a fourth embodiment of an estimation method of incorrect detection.

FIG. 9 is a flowchart showing a fourth embodiment of the estimation method of incorrect detection according to the present invention.

In the fourth embodiment of the estimation method of incorrect detection, when a ratio between the S/N ratios of sectors belonging to the same base station exceeds a predetermined value, the result of measurement of the sector having the smaller S/N ratio is estimated as a result of incorrect detection. Like the first to third embodiments of the estimation method of incorrect detection (FIGS. 5, 7, and 8), the fourth embodiment thereof is also a subroutine to be called in step S102 in the location calculation method (FIG. 4) in the first embodiment of the present invention.

First, to execute processing of the estimation of incorrect detection, "0" is set to the standard sector counter to initialize the standard sector (S161) and "0" is set to the reference sector counter to initialize the reference sector (S162). A check is made to determine whether or not the weight of the standard sector is "0" (S163). If the weight is "0" ("No" in step S163), control proceeds to step S169 without setting the weight of the base station (S167 and S168). On the other hand, if the weight is not "0" ("Yes" in step S163), control proceeds to a subsequent step (S164).

In step S164, a check is made to determine whether or not the weight of the reference sector is "0". If the weight is "0" ("No" in step S164), control proceeds to step S169 without setting the weight of the base station (S167 and S168). On the other hand, if the weight is not "0" ("Yes" in step S164), a check is made to determine whether or not the standard sector and the reference sector belong to one base station (S165). If the base station of the standard sector is other than that of the reference sector ("No" in step S145), control proceeds to step S169 without setting the weight of the base station (S167 and S168). On the other hand, if the base station of the standard sector is equal to that of the reference sector ("Yes" in step S165), the weight of the base station is set according to the result of comparison between the S/N ratio of the standard sector and that of the reference sector (S166 to S168).

That is, according to the fourth embodiment of the estimation method of incorrect detection, the weight of the base station is set in the case in which neither the weight of the standard sector nor that of the reference sector is "0" (S163 and S164) and the standard and reference sectors belong to the same base station (S165).

After the check for the setting of the weight of the base station (S163 to S165) is completely finished, a ratio is calculated between the S/N ratio of the standard sector and that of the reference sector. The ratio is then compared with a predetermined threshold value. If the ratio is less than the threshold value ("Yes" in step S166), the delay time of the standard sector is compared with that of the reference sector, and "0" is set as the weight to either one of the sectors having the larger delay time (S167). If the ratio is equal to or more than the threshold value ("No" in step S166), it is assumed that the signal from the remaining sector having the smaller delay time is unacceptable and hence "0" is set as the weight to the sector having the smaller S/N ratio (S168).

Thereafter, to estimate incorrect detection using the S/N ratio of a subsequent reference sector, the reference sector counter is updated (S169). The value of the reference sector counter is then compared with the maximum value of the reference sector counter (the total number of the reference sectors received). If the value of the reference sector counter is less than the total number of the reference sectors received ("Yes" in step S170), it is assumed that the estimation of correct detection using the S/N ratio has not been completely finished, and hence control returns to step S163. For the next reference sector, an S/N ratio is calculated to estimate the incorrect detection (S163 to S168).

On the other hand, if the value of the reference sector counter is equal to or more than the total number of the reference sectors received, it is assumed that the estimation of correct detection using the S/N ratio has been completely finished for all reference sectors ("No" in step S170). To estimate the incorrect detection using the S/N ratio with a subsequent sector set as a standard sector, the standard sector is updated (a value is added to a counter indicating the standard sector; S171). A value obtained by adding "1" to the value of the standard sector counter is compared with the number of received sectors (the maximum value of the standard sectors, namely, the total number of the received standard sectors). If "value of standard counter+1" is equal to or more than the total number of the received standard sectors ("No" in step S172), it is assumed that the estimation of incorrect detection using the S/N ratio has been completely finished for any sector possibly used as a standard sector, and hence the processing is terminated.

On the other hand, if "value of standard counter+1" is less than the total number of the received standard sectors ("Yes" in step S172), it is assumed that the estimation of incorrect detection using the S/N ratio has not been yet finished for the reference sectors, and hence control returns to step S162. The reference counter is then initialized (S162). Beginning at the first one of the reference sectors, the estimation of incorrect detection is determined according to the difference of measured distance between the sectors using a different standard sector (S163 to S168).

As described above, the location calculation method to which the fourth embodiment of the estimation method of incorrect detection is applied is a location calculation method in which according to propagation delay time of a signal received from a base station having a plurality of sectors, a location of a wireless terminal to receive the signal is calculated. The method includes a first procedure to measure reception timing of a signal transmitted from a base station (each sector), a second procedure in which according to a result of distance measurement of reception timing obtained by the first procedure (the result of the comparison of the S/N ratios between the sectors), a result of measurement of the base station (sector) is estimated as an erroneous result of measurement (incorrect detection), that is, according to a result of the comparison between the S/N ratios of the sectors, a result of measurement of a sector having a smaller S/N ratio or a result of measurement of a sector having a larger delay time between the sectors is selectively estimated as a result of incorrect detection (in which by comparing the S/N ratios of a plurality of sectors of the same base station with each other, if the ratio between the S/N ratios of the sectors is equal to or more than a predetermined value (or exceeds the predetermined value), the result of measurement of the sector having a smaller S/N ratio is estimated as a result of erroneous measurement; and if the ratio between the S/N ratios of the sectors is less than a predetermined value (or equal to or less than the predetermined value), the delay time is compared between the sectors, and the result of measurement of the sector having a larger delay time is estimated as a result of erroneous measurement); and a third procedure to calculate the location of the wireless terminal by removing the result of measurement estimated as incorrect detection by the second procedure from the result of measurement obtained by the first procedure. Therefore, it is possible to remove incorrect pass detection results caused by influence of the delayed wave due to the multipath, influence of noise of the receiver, influence of mutual interference of the neighboring base station, and the like. Consequently, the accuracy of the range measurement is improved and the precision of the measurement of the terminal location is improved in the wireless terminal.

In the unit to estimate incorrect detection of the fourth embodiment of the wireless terminal, according to a result of the comparison between the S/N ratios of the sectors, a result of measurement of a sector having a smaller S/N ratio or a result of measurement of a sector having a larger delay time between the sectors is selectively estimated as a result of incorrect detection (in which by comparing the S/N ratios of a plurality of sectors of the same base station with each other, if the ratio between the S/N ratios of the sectors is equal to or more than a predetermined value (or exceeds the predetermined value), the result of measurement of the sector having a smaller S/N ratio is estimated as a result of erroneous measurement; and if the ratio between the S/N ratios of the sectors is less than a predetermined value (or equal to or less than the predetermined value), the delay time is compared between the sectors, and the result of measurement of the sector having a larger delay time is estimated as a result of erroneous measurement). Therefore, the location measurement precision is improved in the wireless terminal.

Figure 10:
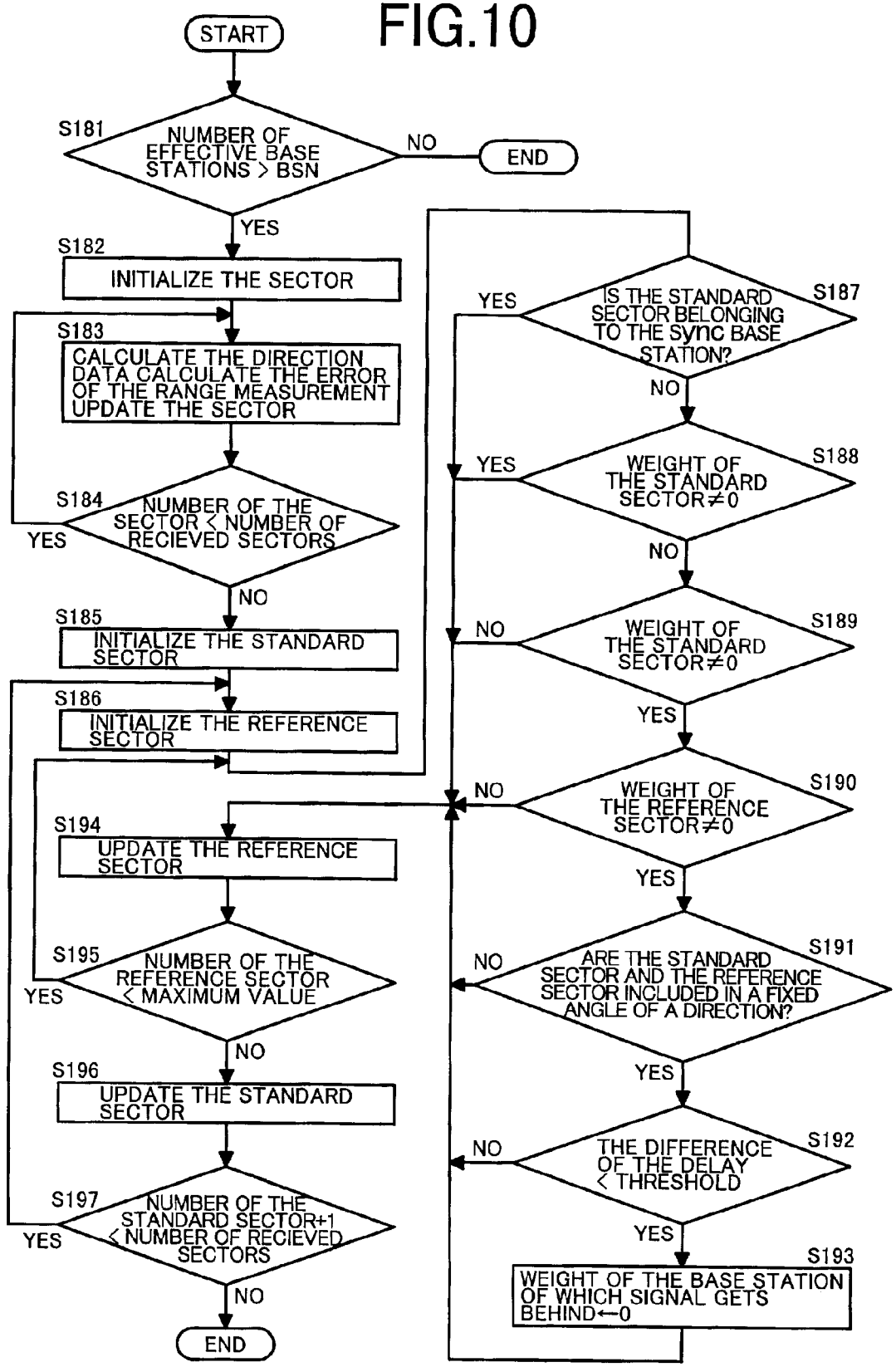
FIG. 10 is a flowchart of a fifth embodiment of an estimation method of incorrect detection.

FIG. 10 is a flowchart showing a fifth embodiment of the estimation method of incorrect detection according to the present invention.

In this estimation method of incorrect detection, a wireless terminal is placed at a virtual location to select base stations at positions in one direction viewed from the virtual position. Moreover, values of difference (rml−rl) are calculated between each measured value rml of distance between the location of the wireless terminal to the base station i and a value of distance rl between a known location (coordinates) of a base station and the base station i. Comparison is made between the differences of measured distance (rml−rl) with each other to estimate a result of measurement of incorrect detection. Like the first to fourth embodiments of the estimation method of incorrect detection (FIGS. 5, 7, 8, and 9), the fifth embodiment thereof is also a subroutine to be called in step S102 in the location calculation method (FIG. 4) in the first embodiment of the present invention.

In a case in which "0" is already set as the weight of sectors for which the incorrect detection is estimated by the estimation of incorrect detection executed before the processing of estimation of incorrect detection of the fifth embodiment, the number of base stations having sectors of which the weight is other than "0" is assumed as a number of effective base stations. If the number of effective base stations exceeds a predetermined threshold value BSN ("Yes" in step S181), the processing of estimation of incorrect detection of the fifth embodiment is executed. On the other hand, if the number of effective base stations is equal to or less than the predetermined threshold value BSN ("No" in step S181), the processing of estimation of incorrect detection of the fifth embodiment is not executed.

When the processing of estimation of incorrect detection of the fifth embodiment can be executed, the system is initialized to execute the processing (S182). A virtual location of a wireless terminal is then determined. In this operation for the virtual location, if the terminal location is repeatedly calculated, a result of a previous calculation may be used in a subsequent calculation. Alternatively, in the location calculation method of FIG. 13, which will be described later, the terminal location obtained in step S222 may be employed. According to the virtual location obtained for the wireless terminal, a distance between the virtual location and a base station, a direction thereto, and an error in range or distance measurement are calculated (S183). The direction to the base station i is represented by (COSi,SINi). The calculation of step S183 is repeatedly conducted by updating the sector until the number of the updated sector reaches that of the received sectors (S184).

After the calculation of the distance, the direction, and the error of range measurement from the virtual position to the base station is completely finished for all sectors (S183), "0" is set to the standard sector counter to initialize the standard sector (S185) and "0" is set to the reference sector counter to initialize the reference sector (S186).

A check is made to determine whether or not the standard sector belongs to a sync base station (S187). As described above, the sync base station is a base station to send a sync channel which the wireless terminal receives. The sync channel includes information of timing at which the base station sends a reference signal. If the standard sector belongs to the sync base station ("Yes" in step S187), control proceeds to step S194 without setting a weight to the base station (S193). On the other hand, if the standard sector does not belong to the sync base station ("No" in step S187), a check is made to determine whether or not the reference sector belongs to the sync base station (S188). If the reference sector belongs to the sync base station ("Yes" in step S188), control proceeds to step S194 without setting a weight to the base station (S193). On the other hand, if the reference sector does not belong to the sync base station ("No" in step S188), control proceeds to a subsequent step (S189).

In step S189, a check is made to determine whether or not the weight of the standard sector is "0". If the weight of the standard sector is "0" ("No" in step 189), control proceeds to step S194 without setting a weight to the base station (S193). On the other hand, if the weight is not "0" ("Yes" in step S189), a check is made to determine whether or not the weight of the reference sector is "0" (S190). If the weight of the reference sector is "0" ("No" in step S190), control proceeds to step S194 without setting a weight to the base station (S193). On the other hand, if the weight of the reference sector is not "0" ("Yes" in step (S190), control proceeds to a subsequent step (S191).

In step S191, for the standard and reference sectors, an angular difference, i.e., $COS(i-j)=COSiCOSj+SINiSINj$ is calculated using the direction of the base station viewed from the virtual location of the wireless terminal obtained in step S183. The angular difference $COS(i-j)$ is compared with a predetermined threshold value to determine whether or not the standard and reference sectors are in the same direction viewed from the virtual location of the wireless terminal. If the angular difference between the direction of a signal from the standard sector and that of a signal from the reference sector exceeds a predetermined angle ("No" in step S191), it is assumed that the standard and reference sectors belong to mutually different base stations. Therefore, control goes to step S194 without setting a weight to the base station (S193). On the other hand, if the angular difference between the direction of a signal from the standard sector and that of a signal from the reference sector is within a predetermined angle ("Yes" in step S191), it is assumed that the standard and reference sectors belong to the same base stations. Delay time of the signal from the standard sector and delay time of a signal from the reference sector are obtained to calculate a difference therebetween. The obtained difference of time is compared with a predetermined threshold value (S192). Resultantly, "0" is set as the weight of the base stations having a larger value of signal delay time (S193). As above, in step S191, any base station within a predetermined angle of the same direction is selected and "0" is set as the weight of the base station.

That is, according to this estimation method of incorrect detection, the weight of the base station is set in the case in which neither the standard sector nor the reference sector belongs to the sync base station (S187 and S188), neither the weight of the standard sector nor that of the reference sector is "0" (S189 and S190) and the standard and reference sectors belong to the same base station (S191).

After the check for the setting of the weight of the base station (S187 to S191) is completely finished, a difference is calculated between the result of measured distance (rmI–rI) obtained according to the distance between the reference sector and the wireless terminal and the result of measured distance (rmJ–rJ) obtained according to the distance between the standard sector and the wireless terminal. The obtained value of difference is compared with a predetermined threshold value. If the difference is less than the threshold value ("Yes" in step S192), "0" is set as the weight of any base station having a larger value of delay time (S193). On the other hand, if the difference is equal to or more than the threshold value ("No" in step S192), control goes to step S194 without setting the weight of the base station.

Thereafter, to estimate incorrect detection using the difference of the measured result for a subsequent reference sector, the reference sector counter is updated (S194). The value of the reference sector counter is then compared with the maximum value of the reference sector counter (the total number of the received reference sectors). If the value of the reference sector counter is less than the total number of the reference sectors received ("Yes" in step S195), it is assumed that the estimation of correct detection using the difference of the measured result has not been completely finished, and hence control returns to step S187. For the next reference sector, the difference of the measured result is calculated to estimate the incorrect detection (S187 to S193).

On the other hand, if the value of the reference sector counter is equal to or more than the total number of the reference sectors received, it is assumed that the estimation of correct detection using the difference of the measured result has been completely finished for all reference sectors ("No" in step S195). To estimate the incorrect detection using the difference of the measured result with a subsequent sector set as a standard sector, the standard sector is updated (a value is added to a counter indicating the standard sector; S196). A value obtained by adding "1" to the value of the standard sector counter is compared with the number of received sectors (the maximum value of the standard sectors, namely, the total number of the received standard sectors). If "value of standard counter+1" is equal to or more than the total number of the received standard sectors ("No" in step S197), it is assumed that the estimation of incorrect detection using the difference of the measured result has been completely finished for any sector possibly used as a standard sector, and hence the processing is terminated.

On the other hand, if "value of standard counter+1" is less than the total number of the received standard sectors ("Yes" in step S197), it is assumed that the estimation of incorrect detection using the difference of the measured result has not been yet finished for the reference sectors, and hence control returns to step S186. The reference counter is then initialized (S186). Beginning at the first one of the reference sectors, the estimation of incorrect detection is determined according to the S/N ratio using a different standard sector (S187 to S193).

According to the fifth embodiment, when the neighboring base station is excessively near the wireless terminal, the angle between the sectors in the same base station becomes to large when viewed from the wireless terminal and an erroneous operation may take place in some cases. However, since the base stations existing in the same direction are apart from several kilometers from each other, only by removing the nearest base station from the processing, there does not arise any problem even when the precision of the virtual location of the wireless terminal is about 100 meters. The nearest base station is a sync base station in the neighborhood thereof. Therefore, by removing a case in which the sync base station is the object of the processing, the erroneous operation can be prevented. For example, it is favorable to select, as in steps S187 and S188, the case in which the standard and reference sectors do not belong to the base station.

As above, in the location calculation method to which the fifth embodiment of the estimation method of incorrect detection is applied is a location calculation method in which according to propagation delay time of signal received from a base station having a plurality of sectors, a location of a wireless terminal to receive the signal is calculated. The method includes a first procedure to measure reception timing of a signal transmitted from each sector, a second procedure in which according to a result of distance measurement of reception timing obtained by the first procedure, that is, in which a direction of each sector from the wireless terminal is calculated to select sectors existing within a predetermined angle using the direction of the sector as a standard direction, difference between distance between a first sector and the wireless terminal and distance between a second sector and the wireless terminal is compared with a predetermined threshold value (difference between the delay time of a signal received from the first sector and that of a signal received from the second sector is compared with a predetermined threshold value) such that according to a result of the comparison, the result of measurement of the sector is estimated as a result of erroneous measurement; and a third procedure to calculate the location of the wireless terminal by removing the result of measurement estimated as incorrect detection by the second procedure from the result of measurement obtained by the first procedure. Therefore, it is possible to remove incorrect pass detection results caused by influence of the delayed wave due to the multipath, influence of noise of the receiver, influence of mutual interference of the neighboring base station, and the like. Consequently, the accuracy of the range measurement is improved and the precision of the measurement of the terminal location is improved in the wireless terminal.

Furthermore, since the incorrect detection is estimated by removing information of the base station which is estimated as the nearest base station to the terminal, the erroneous operation caused by the too short distance therebetween can be prevented.

In the unit to estimate incorrect detection of the fifth embodiment of the wireless terminal, a direction of each sector from the wireless terminal is calculated to select sectors existing within a predetermined angle using the direction of the sector as a standard direction, difference between distance between a first sector and the wireless terminal and distance between a second sector and the wireless terminal is compared with a predetermined threshold value (difference between the delay time of a signal received from the first sector and that of a signal received from the second sector is compared with a predetermined threshold value). According to a result of the comparison, the result of measurement of the sector is estimated as a result of erroneous measurement. Therefore, the accuracy of the location measurement can be improved in the wireless terminal.

Figure 11:
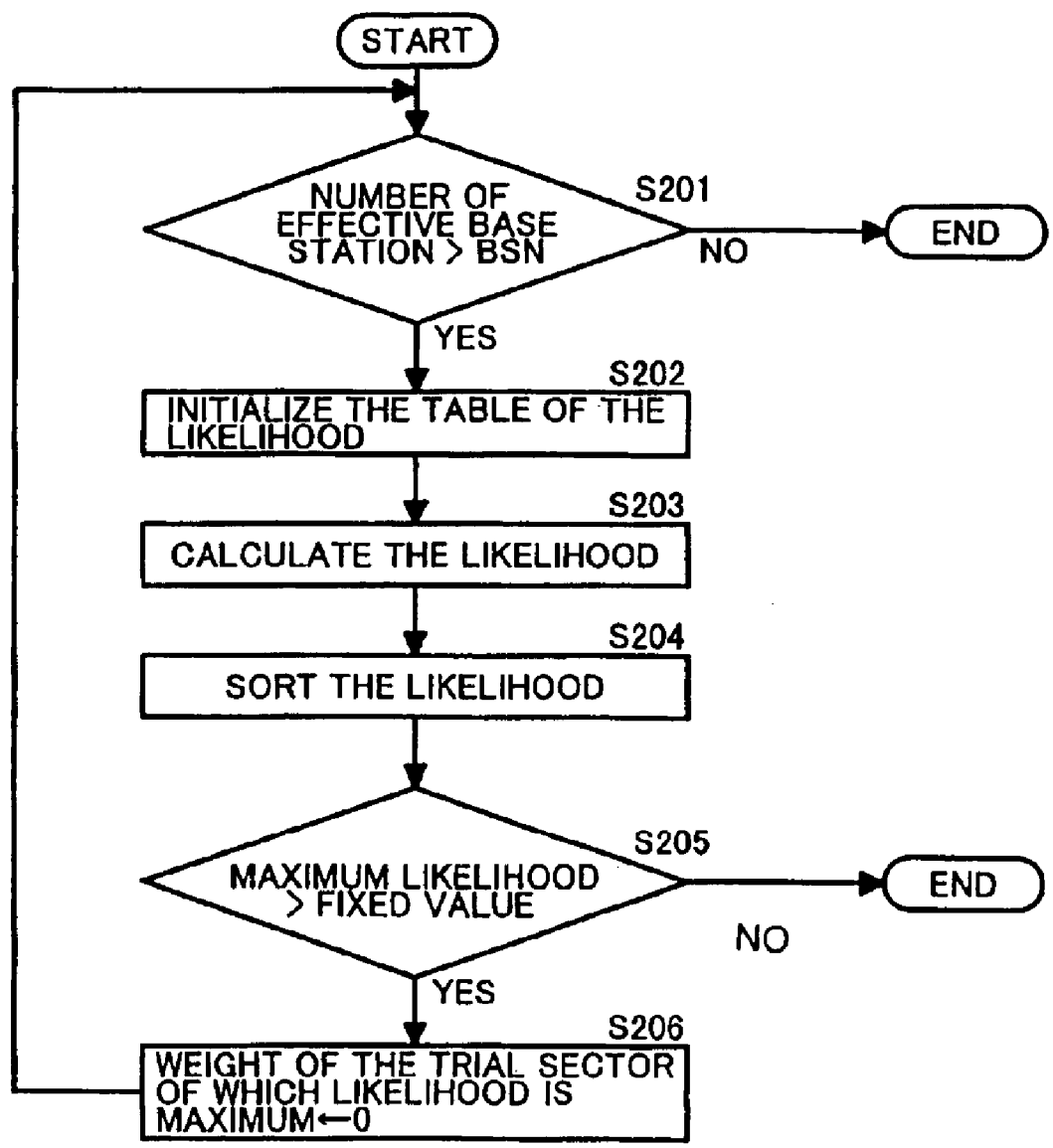
FIG. 11 is a flowchart of a sixth embodiment of an estimation method of incorrect detection.

FIG. 11 shows a sixth embodiment of an estimation method of incorrect detection in a flowchart.

In the sixth embodiment of an estimation method of incorrect detection, positions and likelihood are calculated by removing a result of measurement for a particular base station, the values of likelihood are sorted in an ascending sequence to determine a maximum value of likelihood, a ratio is calculated between the maximum value of likelihood and each value of likelihood other than the maximum likelihood, and then each of the ratios thus obtained is compared with a predetermined threshold value. Like the first to fifth embodiments of the estimation method of incorrect detection (FIGS. 5, 7, 8, 9, and 10), the sixth embodiment thereof is also a subroutine to be called in step S102 in the location calculation method (FIG. 4) in the first embodiment of the present invention.

The likelihood calculated in the sixth embodiment indicates likelihood of an estimated location in a numeric value. Assume that the errors in the range or distance measurement occur according to a Gaussian distribution and the standard deviation of the errors in the distance measurement of a base station i is indicated by σ. Then, the likelihood is represented as follows.

$$L = \prod_i \frac{1}{\sigma\sqrt{2\pi}} \exp\left(-\frac{1}{2\sigma^2}\sum_i \Delta x_i^2\right) \quad (1)$$

Expression (1) represents a distribution.

Moreover, the likelihood can be represented using the errors in distance measurement as follows.

$$L = -\sum_i \Delta x_i^2 \quad (2)$$

In Expression (2), a square sum of the errors in distance measurement is multiplied by −1.

In a case in which "0" is already set as the weight of sectors for which the incorrect detection is estimated by the estimation of incorrect detection executed before the processing of estimation of incorrect detection of the sixth embodiment, the number of base stations having sectors of which the weight is other than "0" is assumed as a number of effective base stations. If the number of effective base stations exceeds a predetermined threshold value BSN ("Yes" in step S201), the processing of estimation of incorrect detection of the fifth embodiment is executed. On the other hand, if the number of effective base stations is equal to or less than the predetermined threshold value BSN ("No" in step S201), the processing of estimation of incorrect detection of the fifth embodiment is not executed.

When the processing of estimation of incorrect detection of the sixth embodiment can be executed, a likelihood table is initialized to execute the processing (S202). The likelihood is calculated for all trial sectors by updating the trial sector and is stored in a storage (S203). The calculated likelihood L(j) is sorted in an ascending sequence (S204).

A ratio is calculated between a maximum value of likelihood and a value of an n-th likelihood relative to the maximum likelihood. The ratio is then compared with a predetermined threshold value as follows (S205).

(Maximum likelihood)/(n-th likelihood relative to maximum likelihood)>Threshold value (3)

In expression (3), n is a symbol or an index to indicate a likelihood value other than the maximum likelihood value.

Next, if the ratio between the maximum likelihood value and the value of the n-th likelihood relative to the maximum likelihood is more than a predetermined value (the maximum likelihood value is larger than any other likelihood value; "Yes" in step S205), "0" is set as the weight of the trial sector associated with the maximum likelihood value. Then, "1" is subtracted from the number of effective base stations (S206). As a result, the maximum likelihood value is obtained by removing the information of the particular trial sector.

On the other hand, if the ratio between the maximum likelihood value and the value of the n-th likelihood relative to the maximum likelihood is equal to or less than the predetermined value ("No" in step S205), the processing is terminated.

In the sixth embodiment, although the ratio between the maximum value of likelihood and the value of the n-th likelihood relative to the maximum likelihood is compared with a predetermined threshold value, it is also possible to compare a ratio between the maximum value of likelihood and a mean value of the likelihood values other than the maximum likelihood value with a predetermined threshold value. This likelihood may be calculated using expressing (1) or (2).

Figure 12:
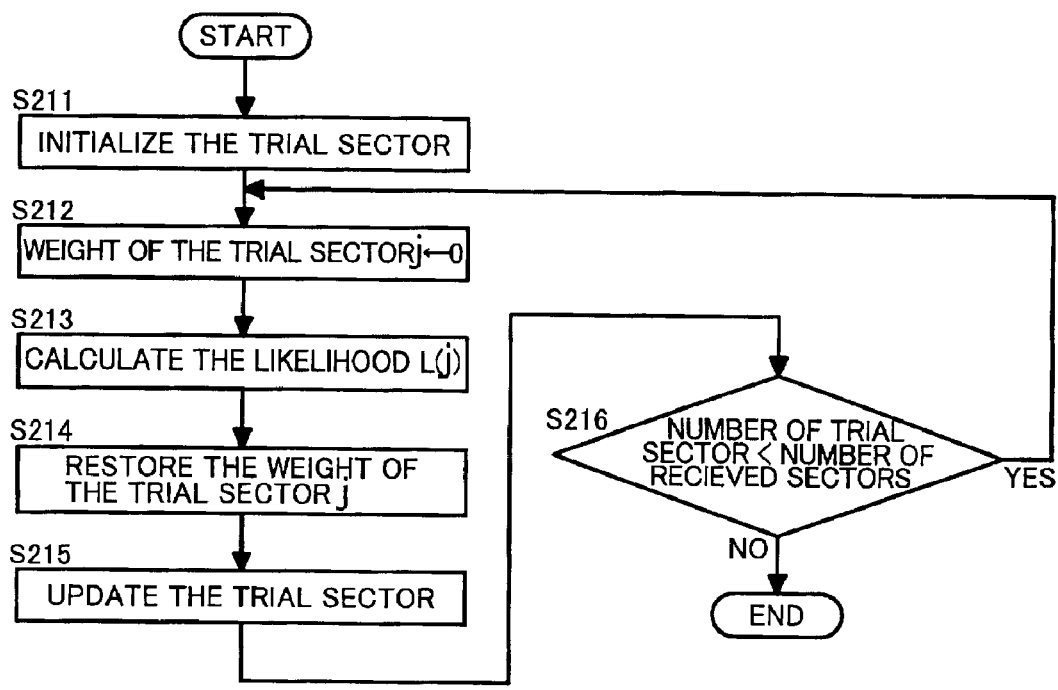
FIG. 12 is a flowchart of a sixth embodiment of a likelihood calculation method.

FIG. 12 shows in a flowchart a method of calculating likelihood of a trial sector in step S202 of the sixth embodiment (FIG. 11).

First, to calculate likelihood for each trial sector, "0" is set to the trial sector counter to initialize the trial sector (S211). The weight of the j-th trial sector is saved in the memory and "0" is set as the weight of the j-th trial sector (S212). Likelihood L(j) is calculated for the j-th trial sector to be stored in the memory (S213). The saved weight of the j-th trial sector is then read from the memory to restore the weight (S214).

Thereafter, to calculate likelihood of a subsequent trial sector, the trial sector counter is updated (S215). The value of the trial sector counter is compared with the reception number (the total number of the received trial sectors, i.e., the maximum number of trial sectors). If the trial sector counter is less than the reception number, it is assumed that the calculation of likelihood for the trial sector has not been completely finished ("Yes" in step S216), control returns to step S212 to calculate likelihood for the next reference sector (S212 to S214).

On the other hand, if the trial sector counter is equal to or more than the reception number, it is assumed that the calculation of likelihood for the trial sector has been completely finished ("No" in step S216), and hence the processing is terminated.

As described above, in the location calculation method to which the sixth embodiment of the estimation method of incorrect detection is applied is a location calculation method in which according to propagation delay time of signal received from a base station having a plurality of sectors, a location of a wireless terminal to receive the signal is calculated. The method includes a first procedure to measure reception timing of a signal transmitted from each sector, a second procedure in which according to a result of distance measurement of reception timing obtained by the first procedure, that is, in which a position and likelihood of the wireless terminal is calculated by removing a result of measurement of a particular sector, a maximum value is selected from the calculated values of the likelihood, and the selected maximum value of likelihood is compared with values of likelihood other than the maximum likelihood such that according to a result of the comparison (when it is assumed that the maximum likelihood value is more than the values of the other likelihood by a value exceeding a criterion of decision), the result of measurement of the sector associated with the maximum likelihood value is estimated as a result of erroneous measurement; and a third procedure to calculate the location of the wireless terminal by removing the result of measurement estimated as incorrect detection by the second procedure from the result of measurement obtained by the first procedure. It is therefore possible to remove incorrect pass detection results caused by influence of the delayed wave due to the multipath, influence of noise of the receiver, influence of mutual interference of the neighboring base station, and the like. Consequently, the accuracy of the range measurement is improved and the precision of the measurement of the terminal location is improved in the wireless terminal.

In the unit to estimate incorrect detection of the sixth embodiment of the wireless terminal, a position and likelihood of the wireless terminal is calculated by removing a result of measurement of a particular sector, a maximum value is selected from the calculated values of the likelihood, and the selected maximum value of likelihood is compared with values of likelihood other than the maximum likelihood such that according to a result of the comparison (when it is assumed that the maximum likelihood value is more than the values of the other likelihood by a value exceeding a criterion of decision), the result of measurement of the sector associated with the maximum likelihood value is estimated as a result of erroneous measurement. Therefore, the accuracy of the location measurement can be improved in the wireless terminal.

Figure 13:
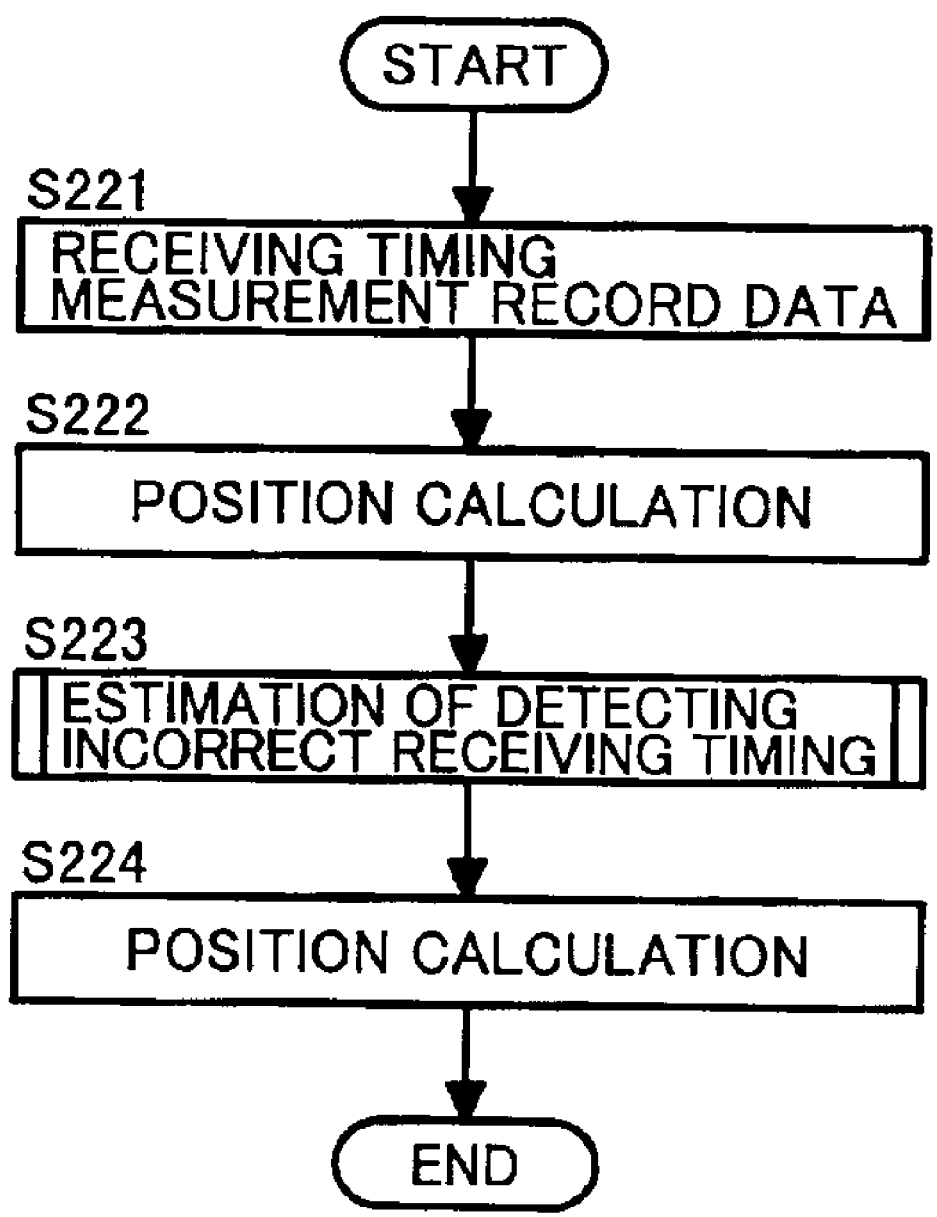
FIG. 13 is a flowchart of a location calculation method in another embodiment of the present invention.

FIG. 13 shows, in a flowchart, another location calculation method of an embodiment according to the present invention.

First, the signal processing unit 4 measures reception timing (propagation delay time) of a signal sent from a base station and then stores the timing in the RAM 7 (S211). Using the propagation delay time obtained in step S211, a virtual location of the wireless terminal is calculated (S222). According to measurement result stored in the RAM 7, the CPU 6 estimates a result of measurement of incorrect detection using the virtual location of the wireless terminal obtained in step S211 (S223). The CPU 6 then calculates again a location of the wireless terminal using the propagation delay time from which the propagation delay time determined as an incorrect detection is removed (S224).

In this way, according to the location calculation method shown in FIG. 13, the location is calculated before the incorrect detection of reception timing is estimated. Therefore, the location calculation method is suitable to the estimation method of incorrect detection (for example, the fifth embodiment shown in FIG. 10) in which the incorrect detection is estimated using a virtual location of the wireless terminal.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

We claim:

1. A location calculation method using propagation delay time of signals transmitted between a plurality of base stations and a mobile terminal, comprising:

a first step of measuring reception timing of signals transmitted between said plurality of base stations and said mobile terminal;

a second step of estimating, according to the result of the measurement of the reception timing of signals obtained by said first step, an erroneous result of measurement;

a third step of removing the result of the measurement estimated as the erroneous result of measurement by the second step from the result of the measurement of the reception timing of signals obtained by said first step, and thereby calculating the location of the mobile terminal; and a fourth step of determining a standard base station among said plurality of base stations, wherein said second step includes estimating, according to a result of a determination of distance measurement whether or not a triangle is formed, using an estimated distance between the mobile terminal and the standard base station, an estimated distance between the mobile terminal and a base station used as an object of the estimation, and a distance between the standard base station and the base station used as the object of the estimation, wherein the result of the determination of distance measurement for the base station used as the object of the estimation not satisfying the triangle forming condition is an erroneous result of measurement.

2. The location calculation method according to claim 1, wherein:

a plurality of sectors each of which is formed by a base station constitute a wireless facility; and said second step further includes determining, according to a result of a comparison between the result of the determination of distance measurement regarding each sector of one wireless facility and a predetermined threshold value, whether the result of the determination of distance measurement regarding the wireless facility is an erroneous result of measurement.

3. The location calculation method according to claim 2, wherein the result of the determination of distance measurement regarding each sector is compared, as a difference between a delayed time of the respective sector, with a predetermined threshold value.

4. The location calculation method according to claim 1, wherein:

a plurality of sectors each of which is formed by a base station constitute a wireless facility; and said second step further includes selectively estimating, according to a result of a comparison between S/N ratios regarding the respective sectors of one wireless facility, the result of the determination of distance measurement regarding a sector having a smaller S/N ratio or a sector having longer delay time between the sectors as an erroneous result of measurement.

5. The location calculation method according to claim 1, wherein said second step includes calculating a position of the mobile terminal and a likelihood by excepting a result of measurement of a selected base station, selecting a maximum value of the calculated values of the likelihood, comparing the maximum likelihood value with other values of the likelihood, and estimating, according to a result of the comparison, the result of measurement of the selected base station associated with the maximum likelihood value as an erroneous result of measurement.

6. A location calculation method using propagation delay time of signals transmitted between a plurality of base stations and a mobile terminal, comprising:

a first step of measuring reception timing of signals transmitted between said plurality of base stations and said mobile terminal;

a second step of estimating, according to the result of the measurement of the reception timing of signals obtained by said first step an erroneous result of measurement;

a third step of removing the result of the measurement estimated as the erroneous result of measurement by the second step from the result of the measurement of the reception timing of signals obtained by said first step, and thereby calculating the location of the mobile terminal; and fourth step of calculating a direction of a base station from the mobile terminal, wherein said second step selecting, as base stations constituting two sectors of a same wireless facility, a first base station and a second base station existing within a predetermined angle by using the direction of the base station from the mobile terminal, obtaining a difference between a first and the first base station and a second distance between the mobile terminal and the second base station, comparing the difference obtained with a predetermined threshold value, and determining the result of the difference obtained between the first distance and the second distance as an erroneous result of measurement when the difference obtained between the first distance and the second distance is more than the predetermined threshold value according to a result of the comparison.

7. The location calculation method according to claim 6, wherein the difference between the distance between the mobile terminal and the first base station and the distance between the mobile terminal and the second base station is compared, as a difference in delay time between a signal received from the first base station and a signal received from the second base station, with a predetermined threshold value.

8. The location calculation method according to claim 6, comprising a step of estimating a base station nearest to the mobile terminal, removing information associated with a signal received from the nearest base station, and selecting base stations existing in one direction.

9. A location calculation apparatus for calculating, by using propagation delay time of signals transmitted between a plurality of base stations and a mobile terminal, a location of said mobile terminal comprising:

reception timing measuring means for measuring reception timing of signals received from said plurality of base stations;

erroneous measurement estimating means for estimating, according to the result of measurement of the reception timing of signals measured by said reception timing measuring means, an erroneous result of measurement, said erroneous measurement estimating means for estimating, according to a result of a determination of distance measurement whether or not a triangle is formed, using an estimated distance between the mobile terminal and a standard base station, an estimated distance between the mobile terminal and a base station used as an object of the estimation, and a distance between the standard base station and the base station used as the object of the estimation, wherein the result of the determination of distance measurement for the base station used as the object of the estimation not satisfying the triangle forming condition is an erroneous result of measurement; and location calculating means for removing the result of measurement estimated as the erroneous result of measurement by said erroneous measurement estimating means from the results of measurement of the reception timing of signals obtained by said reception timing measuring means, and thereby calculating the location of said mobile terminal.

10. A software product for executing, by a computer, a location calculation method for calculating, by using signals transmitted between a plurality of base stations and a mobile terminal, a location of said mobile terminal comprising:

a first step of measuring reception timing of signals received from said plurality of base stations;

a second step of estimating, according to the result of measurement of the reception timing of signals obtained by said first step, an erroneous result of measurement; and a third step of removing the result of the measurement estimated as the erroneous result of measurement by the second step from the result of the measurement of the reception timing of signals obtained by said first step, and thereby calculating the location of said mobile terminal, wherein said second step includes estimating, according, to a result of a determination of distance measurement whether or not a triangle is formed, using an estimated distance between the mobile terminal and a standard base station, an estimated distance between the mobile terminal and a base station used as an object of the estimation, and a distance between the standard base station and the base station used as the object of the estimation, wherein the result of the determination of distance measurement for the base station used as the object of the estimation not satisfying the triangle forming condition is an erroneous result of measurement.

11. The software product according to claim 10, further comprising a step of calculating, according to propagation delay time of signals received from the plurality of base stations, the location of said mobile terminal.

12. The software product according to claim 10, wherein the plurality of base stations are wireless transmitters.

13. The software product according to claim 10, wherein the computer serves as a location calculating apparatus.

14. A control apparatus comprising a central processing unit (CPU) and a memory to store a program, wherein:

said memory has stored a program for executing by the CPU;

a first step of measuring reception timing of signals transmitted between a plurality of base stations and a mobile terminal;

a second step of estimating, according to the result of measurement of the reception timing of signals obtained by said first step, an erroneous result of measurement; and a third step of removing the result of measurement estimated as the erroneous result of measurement by the second step from the result of measurement of the reception timing of signals obtained by said first step, and thereby calculating the location of said mobile terminal, wherein said second step includes estimating, according to a result of a determination of distance measurement whether or not a triangle is formed, using an estimated distance between the mobile terminal and a standard base station, an estimated distance between the mobile terminal and a base station used as an object of the estimation, and a distance between the standard base station and the base station used as the object of the estimation, wherein the result of the determination of distance measurement for the base station used as the object of the estimation not satisfying the triangle forming condition is an erroneous result of measurement, and wherein said CPU executes said program stored in said memory.

15. The control apparatus according to claim 14, wherein said control apparatus is constructed as a semiconductor integrated circuit.

16. A location calculation method using propagation delay time of signals transmitted between each of a plurality of base stations and a mobile terminal, comprising:

a first step of measuring reception timing of signals transmitted between a base station of said plurality of base stations and said mobile terminal to obtain a first distance between the base station of said plurality of base stations and the mobile terminal;

a second step of determining an incorrect distance to be removed, including the sub-steps of:

(A) selecting a standard base station from said plurality of base stations;

(B) obtaining both a second distance between the base station of said plurality of base stations and the standard base station, and a third distance between the standard base station and the mobile terminal; and (C) determining whether the first distance, the second distance and third distance form a triangle, whereby an incorrect distance is determined when the first distance, the second distance and the third distance do not form a triangle, thus finding an incorrect distance in the first, second and third distances in accordance with the amounts of the first, second and third distances; and a third step of calculating a position of the mobile terminal, by using propagation delay time of signals transmitted between each of the plurality of base stations and the mobile terminal, according to a result of the second step by removing any said incorrect distance found in the second step.

* * * * *